Oct. 23 1951     L. L. SALFISBERG     2,572,056
LABELED PACKAGE
Filed Sept. 14, 1946     2 SHEETS—SHEET 1
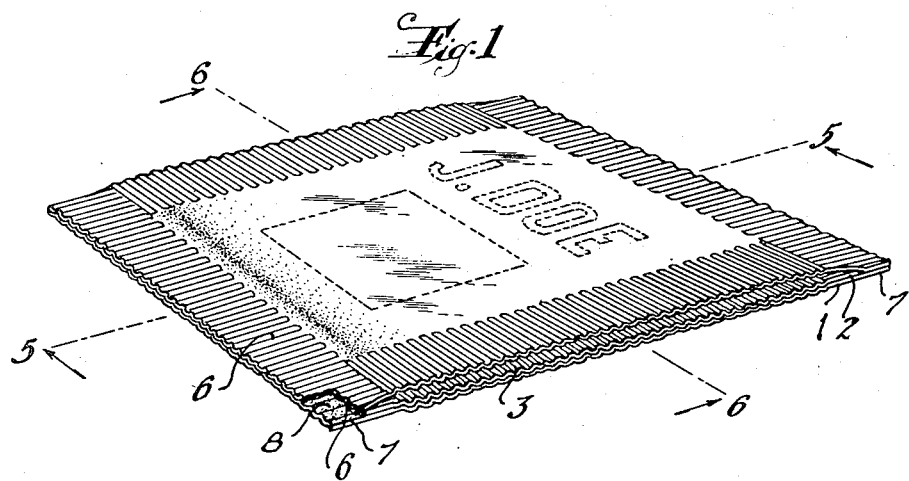
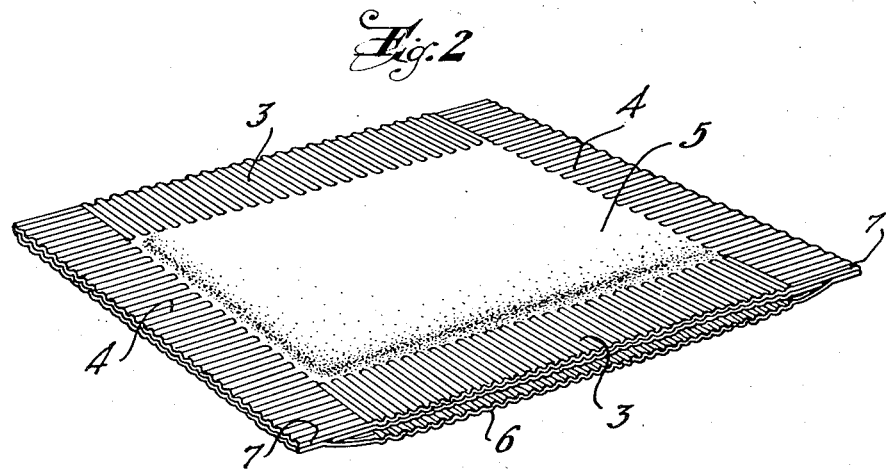
INVENTOR.
LEROY L. SALFISBERG,
BY
ATTORNEY.

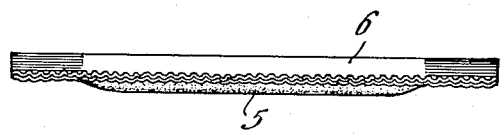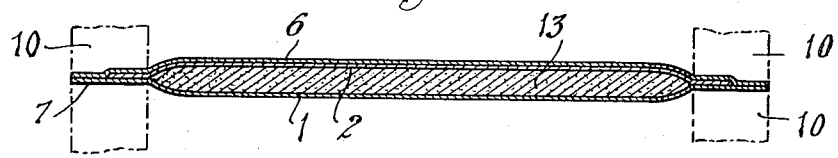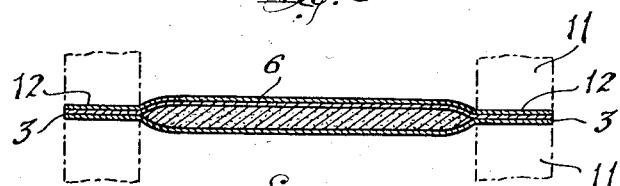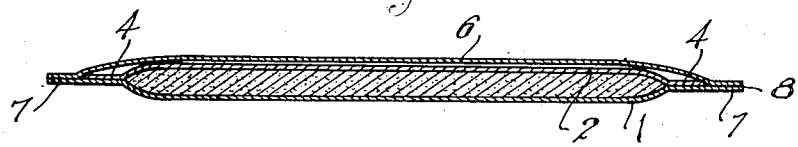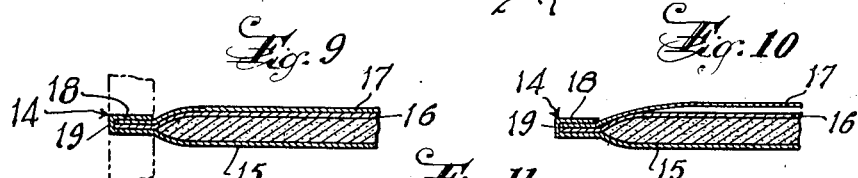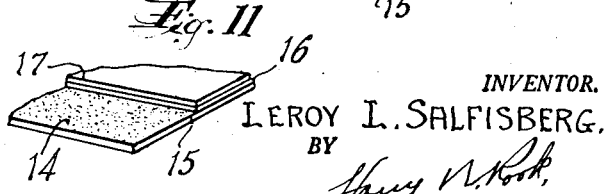

Patented Oct. 23, 1951

2,572,056

UNITED STATES PATENT OFFICE 2,572,056

LABELED PACKAGE

Leroy L. Salfisberg, South Orange, N. J., assignor to Ivers-Lee Company, Newark, N. J., a corporation of Delaware Application September 14, 1946, Serial No. 696,991

1 Claim. (Cl. 206—46)

This invention relates in general to commodity packages of the type comprising a plurality of layers of packaging material, at least two of which are sealed together in zones forming and bounding a commodity-receiving compartment, and more particularly the invention pertains to such packages which have a label or other facing or backing sheet attached thereto. For example, the invention contemplates a package that comprises layers of packaging material, such as "Pliofilm," "Cellophane" or metal foil sealed together to form an article-containing compartment between the layers, and another layer or sheet of material such as paper to serve as a label or as a facing or backing sheet for the article-containing compartment.

The application of labels or backing or facing sheets to packages of this character generally involves difficulty in handling of the various sheets or layers of material and in sealing the label, backing or facing sheet to the layer of packaging material.

Accordingly, one object of the present invention is to provide a package of the general character described which shall have a label, backing or facing sheet attached thereto in a novel and improved way, whereby the package can be easily and economically produced.

Another object is to provide a novel and improved method of attaching a label, backing or facing sheet to a package of the general character described so that the layers of packaging material can be sealed together to form the article-containing compartment and at the same time the label, backing or facing sheet can be fastened to the package.

Generally, the layers of packaging material used in making such packages have one side thereof coated with a thermoplastic material or adhesive so that the layers may be arranged in opposed relation with their coated sides in contact with each other, and can be secured together under pressure with or without the application of heat; and another object of my invention is to provide a novel and improved package and method of making it wherein the label, backing or facing sheet is attached to the package by the adhesive or thermoplastic coating on a portion of one of the layers of packaging material.

Other objects, advantages and results of the invention will be brought out by the following description in conjunction with the accompanying drawings in which:

Figure 1 is a perspective view of a labeled package embodying my invention, showing the labeled side uppermost.

Figure 2 is a perspective view of the package viewing the same from the side opposite that illustrated in Figure 1.

Figure 3 is a side elevational view of the package.

Figure 4 is an end elevational view thereof.

Figure 5 is a longitudinal vertical sectional view on the plane of the line 5—5 of Figure 1.

Figure 6 is a transverse sectional view on the plane of the line 6—6 of Figure 1.

Figure 7 is a longitudinal vertical sectional view through the package illustrating one step in the method of attaching the label.

Figure 8 is a transverse vertical sectional view through the package during the same step in the operation of attaching the label that is illustrated in Figure 7.

Figure 9 is a view similar to Figure 7 showing a modification of the invention with portions broken away.

Figure 10 is a fragmentary view similar to Figure 9; and

Figure 11 is a fragmentary perspective view of the label and sheets of packaging material showing them as assembled prior to the step illustrated in Figure 9.

Specifically describing the embodiment of the invention illustrated in Figures 1 to 8 inclusive, the package has been shown as comprising two layers, strips or sheets 1 and 2 of packaging material, for example metal foil, "Pliofilm," "Cellophane," paper or fabric, which are sealed together in longitudinal zones 3 and transverse zones 4 to form and bound a compartment 5 between the layers for receiving a commodity such as a powder, paste, pills and the like.

Initially, the juxtaposed sides of the sheets 1 and 2, at least along the portions thereof in the zones 3 and 4, are either coated with an adhesive, a thermoplastic composition, or are fixable so that they may be sealed together in the zones 3 and 4 by the application of pressure with or without heat, depending upon whether a thermoplastic or fusible substance is utilized.

In accordance with the invention, portions of one of the sheets 1 and 2 extend beyond the other sheet so as to expose said adhesive or thermoplastic substance, and a label, facing or backing sheet 6 is secured to said projecting portions of said sheet by the adhesive or thermoplastic substance. As shown, the opposite end portions of the sheet 1 of packaging material extend beyond the corresponding end portions of the sheet 2 as indicated at 7, and said projecting portions have on their exposed surfaces 8 an adhesive or thermoplastic composition to which the opposite end portions 9 of the label 6 are secured.

Preferably the label is secured to the package in the same operation during which the packaging sheets 1 and 2 are sealed together, and as shown in Figures 7 and 8, the sheets 1 and 2 are sealed together in the transverse zones 4, and the label is sealed to the projecting portions 7 of the sheet 1 by cooperating pressing die sections 10, while at the same time the longitudinal margins of the sheets 1 and 2 are sealed together by die sections 11 to form the zones 3. It will be noted that the longitudinal marginal portions 12 of the label will be gripped between the die sections 11 so as to permit them to press the layers 1 and 2 together, but will not be sealed to the packaging sheet 2 because there is no sealing medium between the label and said sheet 2.

It will be understood that the above-mentioned sealing operations may be performed simultaneously or at different times as may be desired according to normal practices in the art, and the commodity or substance being packaged, such as powder 13, may be inserted into the compartment in any suitable manner and at any suitable time.

It will be seen that this structure and method facilitate the application of labels to packages of this general nature, permitting the attachment of the label at the same time the package is formed instead of requiring a separate operation for attaching the label as has been the most common practice heretofore; and, furthermore, the use of the adhesive coating or properties of the packaging material for attaching the label avoids the necessity for separately applying an adhesive coating to either the label or the packaging material.

A modification of the invention is shown in Figures 9, 10 and 11 where the projecting portions 14 of one of the packaging layers 15 and 16 are folded upwardly and inwardly over the end portions of the label, backing or facing sheet 17 as indicated at 18, so that the label is secured beneath the inturned edge of the packaging sheet, and the fold 19 of the packaging sheet 15 provides in effect a binding and reenforcement for the edges of the several sheets.

While I have shown and described the invention as embodied in two specific forms of packages, it should be understood that the structure of the package and the steps of the method may be modified and changed within the spirit and scope of the invention.

I claim:

A package comprising at least two opposed polygonal layers of packaging material one of which has a thermoplastic surface juxtaposed to the other layer and also has spaced marginal portions with said thermoplastic surface extending beyond each of two opposite edges of the other layer, the other edges of each layer being in register with the corresponding edges of the other layer, said layers being thermoplastically sealed together in all marginal zones of the second-mentioned layer and forming a commodity compartment between said layers, and a cover sheet loosely overlying the exterior of the second-mentioned layer and having marginal portions overlying and heat-sealed only to said thermoplastic surfaces on the said extending marginal portions of the first-mentioned layer, said cover sheet being otherwise free from said compartment.

LEROY L. SALFISBERG.

REFERENCES CITED

The following references are of record in the file of this patent:

UNITED STATES PATENTS

| Number | Name | Date |
| --- | --- | --- |
| 1,434,097 | Conner | Oct. 31, 1922 |
| 1,476,682 | Beckmann | Dec. 11, 1923 |
| 2,069,335 | Salfisberg | Feb. 2, 1937 |
| 2,257,823 | Stokes | Oct. 7, 1941 |
| 2,344,369 | Salfisberg | Mar. 14, 1944 |
| 2,465,172 | Salfisberg | Mar. 22, 1949 |